Sept. 27, 1966   TETSUICHI KANEKO   3,275,983
ULTRASONIC INCLINATION METER
Filed July 30, 1963   2 Sheets-Sheet 1
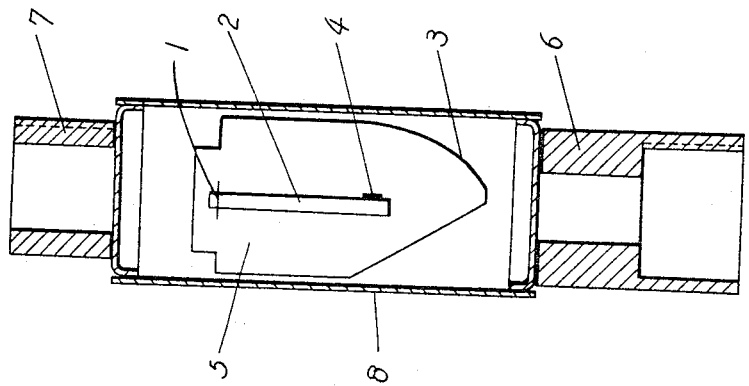
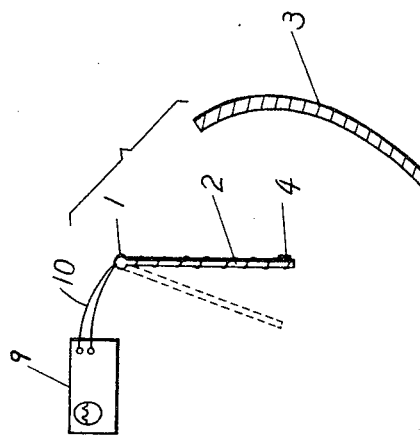
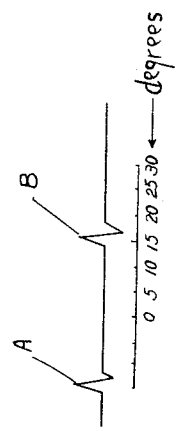
INVENTOR.
TETSUICHI KANEKO
BY
Davis, Hoxie, Faithfull & Hapgood INVENTOR.
TETSUICHI KANEKO
BY
Davis, Hoxie, Faithfull & Hapgood

United States Patent Office 3,275,983
Patented Sept. 27, 1966

3,275,983
ULTRASONIC INCLINATION METER
Tetsuichi Kaneko, Tokyo, Japan, assignor to Oyo Chishitsu Co. Ltd., Tokyo, Japan, a corporation of Japan
Filed July 30, 1963, Ser. No. 298,783
Claims priority, application Japan, Aug. 7, 1962, 37/32,587
4 Claims. (Cl. 340—18)

This invention relates to inclination meters, and more particularly to an improved type of metering apparatus for measuring the angular inclination and direction of well boreholes and other engineering structures from a vertical position.

In the drilling of well boreholes to obtain water, oil, gas and other materials from the earth subsurface, it is often desirable during the drilling operation to know the angular inclination of the borehole in a given direction. It may also be desirable to know the true angular inclination and direction of the borehole in any direction. In certain forms of drilling, these measurements are necessary to insure the correct placement of the well and to avoid encroaching across property lines. Other forms of drilling require several boreholes to be placed at controlled angles and directions from a single drilling platform. Geological surveys of subsurface layers also require a knowledge of the inclination from the vertical of the measuring instruments in order to make appropriate corrections, and the construction of structures above ground often necessitates a knowledge of the inclination of certain building areas. All of these uses require inclination meters which will function accurately without requiring lengthy interruptions of experience drilling and building operations. They also require meter apparatus which may be controlled and read in remote locations, so that the apparatus can function in small and relatively inaccessible areas.

In the past, instruments have been developed for the above measuring purposes, the use of which involve expensive interruptions in drilling and building operations and which are complex and burdensome in equipment and operation as well as being subject to error. Certain meters utilize a camera and pendulum-compass arrangement wherein the apparatus is lowered into a borehole and the compass and deviation of the pendulum in relation to a fixed reference are photographic. The apparatus must then be raised from the borehole and the film developed, drilling operations necessarily being halted in the meantime until the inclination angles and directions are determined from the photographs. The drilling of a deep borehole may require a large number of inclination and direction readings, and the total time delay for continually inserting and removing the measuring equipment is considerable. Other types of meters depend on the frequency of vibration of the drill string used in the drilling operation, the frequency of vibration of the string being made to vary as the inclination of the meter varies. The drill string is also subject to extraneous vibrations of the drilling rig and vibrations in the ground, however, and inclination readings are thereby subject to error. In addition, this type of meter has no means of showing either the inclination of a borehole in a given direction or the true direction of inclination of a borehole. Still further types of meters depend upon a light source, photoelectric cells, an optical system compass, and several intricate moving parts for their operation in measuring the angles and directions of inclination. These elaborate parts all are easily damaged by shock commonly encountered in drilling operations, and in addition the compass reading is subject to the magnetic properties of the meter casing and magnetic ore often found surrounding boreholes.

Accordingly, it is the principal object of the present invention to provide an improved type of metering apparatus which solves the problems mentioned above in reference to presently used meters.

Further objects of the invention are to provide an accurate inclination metering apparatus which is rugged in construction, small in size, involves a minimum of equipment, is capable of operation with a drilling rig while said rig is in operating position, and which may be controlled and read from a remote location.

The objects and advantages of the present invention are accomplished by a meter or meters utilizing the propagation of an ultrasonic pulse in a liquid. The meter consists of a casing, a pendulum, transducer and reflecting surface within said casing and immersed in a liquid, and electrical connections from the transducer to electrical driving, receiving and recording apparatus set apart from the meter. The transducer is affixed to the pendulum, and the pendulum is suspended within the casing so as to freely rotate in one plane of direction. Where the angular inclination of a borehole in a given direction is required, the meter is orientated in the borehole so that the plane of rotation of the pendulum is the plane in which the inclination of the meter is desired to be known. The pendulum, by its free rotation, tends to assume and maintain a vertical position regardless of the angular inclination of the meter in the plane of rotation of the pendulum. The transducer is driven from a position remote from the meter to produce ultrasonic pulses, and the pulses pass through the liquid to the reflecting surface, which is affixed to the meter casing. The pulses are then reflected back to the transducer, converted to electrical pulses and sent on to the remote receiver. Both the ultrasonic pulses transmitted from the transducer and the ultrasonic pulses received by the transducer from the reflecting surface are permanently recorded at the remote location as electrical pulses. As the meter, and therefore the reflecting surface, become inclined in the plane of rotation of the pendulum at a given angle to their original vertical position, the pendulum tends to remain in a vertical position by rotating through the same inclination angle relative to its original position. The reflecting surface is made in a geometrical shape such that the distance between the transducer and the reflecting surface varies in direct proportion to the change in the inclination angle. As the inclination angle and said distance vary, the time for each transmitted pulse to be reflected back to the transducer will accordingly vary. This elapse of time is off course proportioned to the distance between the transducer and reflecting surface and since this distance in turn changes in direct proportion with changes in the inclination angle, the time elapse between the transmitted and reflected pulses provides a means of direct measurement of the inclination angle in the plane of rotation of the pendulum. This time elapse is calibrated at the remote recording apparatus for the vertical position of the inclination meter, and all time deviations from this reference may be directly calibrated on a scale in terms of inclination angles of the meter from the vertical in the plane of rotation of the pendulum. If the true inclination of the borehole is required, in any direction and not merely in the plane of rotation of the pendulum, this inclination angle and its geographical direction may be measured by merely taking the vector summation of the scale readings of two such described meters attached and placed at right angles to each other. Since the planes of rotation of the pendulums of each meter will be known, the direction and true angle of the borehole is easily found.

The present invention will be more easily understood by those skilled in the art to which it pertains from the following detailed description of a preferred embodiment, when taken in conjunction with the enclosed drawings, in which:

FIGURE 1 is a schematic representation of certain elements of the present invention and includes the electrical driving, receiving and recording apparatus used to determine inclination angles;

FIGURE 2 is a view of the present invention mounted within its meter casing, with the forward wall of said casing being cut away to show the elements included therein;

FIGURE 3 illustrates the typical record taken by the recording apparatus of the present invention;

Figure 4:
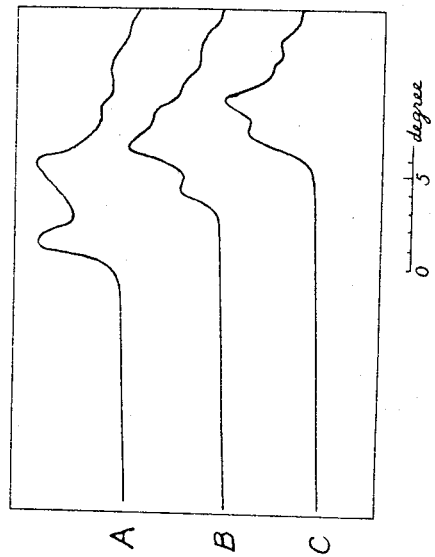
FIGURE 4 is a chart of reflected pulse time plotted against degrees of angle.
Figure 5:
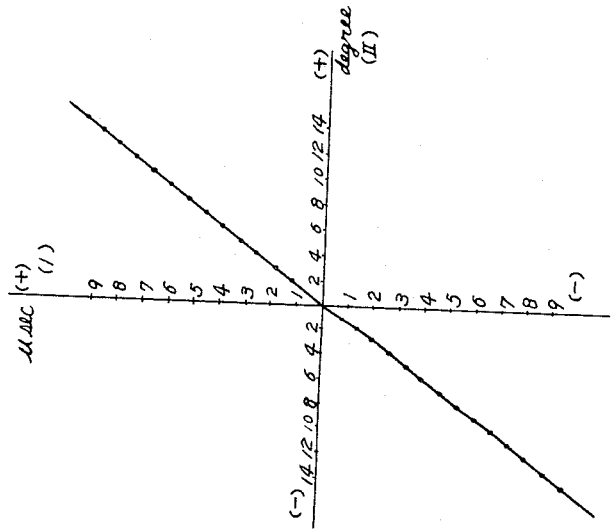
FIGURE 5 shows the shape of typical reflected pulses.

The numeral 2 in the drawings designates a pendulum supported by a pivot at its upper end so that the pendulum can rotate freely about the pivot in one plane (the plane of the paper in the drawings). Pivot 1 is in turn affixed to the cylindrical meter casing 8, shown in FIG. 2 as surrounding the elements separately shown in FIG. 1. Pendulum 2 will assume and remain in a vertical position in its plane of rotation at all times regardless of what inclination angle the remainder of the meter assumes during the course of being lowered into a borehole. Therefore, when the meter as a whole is inclined at a certain inclination angle $\theta$ from the vertical in the plane of rotation of pendulum 2, the pendulum will rotate about pivot 1 through the same angle $\theta$ relative to its original position to tend to remain in a vertical position.

Attached to the bottom of pendulum 2 is transducer 4 which may be made of well-known transducer materials such as quartz crystal or barium titanate ceramic. The transducer is electrically connected through wiring 10 to electrical pulse driving, receiving and recording apparatus 9 of any well-known form. This apparatus will commonly be set remote from transducer 4, such as on the ground surface when the metering apparatus is being used in a borehole.

Positioned adjacent to transducer 4 is a plate 3 made of any durable material suitable for the reflecting of ultrasonic pulses. Plate 3 is attached to, or forms a part of, meter casing 8, and plate 3, as well as transducer 4 and pendulum 2, are immersed in a liquid S as shown in FIG. 2, filling meter case 8. The liquid serves to transmit the ultrasonic pulses, to be described more fully below, and also cushions the transducer 4 from shocks received by the meter casing 8 as it is lowered into a borehole. In addition, the liquid damps the oscillations of pendulum 2 as it rotates to tend to maintain its vertical position or as the meter casing 8 receives shocks. The curved line of the reflecting plate 3 is made in the form of an involute curve, such that the distance from the transducer 4 to the reflecting plate 3 in the plane of rotation of pendulum 2 will always vary in direct proportion to changes in the inclination angle of the meter in said plane of rotation. This distance will therefore vary in direct proportion to changes in the angle that pendulum 2 rotates through in tending toward its vertical position.

Electrical pulses are transmitted from driving apparatus contained within remote apparatus 9 to transducer 4. These signals are then converted to ultrasonic pulses by the transducer and propagated from the transducer through liquid 5 to reflecting plate 3. The ultrasonic pulses are reflected back through the liquid to the same transducer 4, and transmitted as electrical pulses to receiving apparatus contained within remote apparatus 9. The transmitted and received electrical pulses are both recorded at remote apparatus 9, as shown in FIG. 3.

The time interval between the transmitted pulse A and the received pulse B, as shown on the recording apparatus, is given by the equation $t=2l/v$; $l$ denotes the distance in the plane of rotation of pendulum 2 between transducer 4 and reflecting plate 3, and $v$ denotes the velocity of the ultrasonic pulse in the liquid S. Since $l$ varies in direct proportion to changes in the inclination angle $\theta$ in said plane of rotation, as described above, and since $v$ is a constant for any given liquid, the time elapse between pulse A and pulse B will vary in direct proportion to changes in the inclination angle $\theta$ as shown in FIG. 4. A scale may therefore be calibrated at the recording apparatus as shown in FIG. 3, with the zero point representing where a received pulse would fall under the condition of the inclination meter being in a vertical position and therefore at an inclination angle of zero degrees. As the meter becomes inclined at an angle in the plane of rotation of pendulum 2, the pendulum will rotate through the same angle to one or the other side of its original position, and the time elapse between transmitted and received pulses varying in direct proportion to this change in inclination angle allows the record as shown in FIG. 3 to be calibrated and read directly in degrees of inclination.

The above-described metering apparatus is useful for determining the angle of inclination of the meter in a given direction in a borehole, and the meter when placed in the borehole is orientated so that the plane of rotation of the pendulum lies in the given direction. The meter may be attached to a drill string by interfitting connections 6 and 7, or may be separately suspended in the borehole. When attached to a rotating drill string, the drilling operation is halted momentarily and the drill string is aligned so that the plane of rotation of the meter pendulum will lie in the direction for which the inclination angle is desired to be known. A meter reading is quickly taken, and the drill string is again put in operation after only a very short pause. Should the true angle and direction of inclination of a borehole be required rather than the angle of inclination in a given direction, it is then necessary to utilize two meters of a form exactly as described above. These two meters will be attached at right angles to each other at either connection 6 or 7 to give two respective sets of inclination angle readings in planes at right angles to each other. The vector summation of these two sets of readings provides the true inclination angle and direction of the borehole.

While the inclination metering apparatus has been described above in terms of use in well boreholes, it is recognized that the apparatus will be of use in any structure wherein angles and directions of inclination are desired to be known. The meter itself is small in size, rugged in construction, and involves a minimum of equipment. It may also be used in areas inaccessible to man or large and complex equipment, since the driving and recording of the meter operation may be controlled from a location remote from the actual position of the meter. Use of the meter during a drilling operation likewise involves little, if any, interruption in the actual drilling, since meter readings may be recorded in a matter of microseconds.

Accordingly, while only one embodiment of this invention has been described in detail, many modifications and improvements will occur to those skilled in the art to which it pertains within its broad scope and spirit.

I claim:
1. Inclination metering apparatus comprising, in combination, electrical pulse driving, receiving and recording equipment and an ultrasonic inclination meter, said meter comprising a casing, a pivot mounted within the casing, a pendulum suspended from the pivot to freely rotate about said pivot in one plane of rotation, a transducer mounted on said pendulum and electrically connected to said pulse equipment, a reflecting plate mounted within said casing, and a liquid filling said casing and immersing the pendulum transducer and reflecting surface, wherein the transducer is driven to propagate ultrasonic pulses toward, and receive reflected pulses from, the reflecting plate, wherein the distance between the transducer and the reflecting plate changes in direct proportion to the change in the inclination angle from the vertical of the meter in the plane of rotation of the pendulum, wherein the propagated and reflected pulses are recorded on the pulse recording equipment, and wherein the time elapse between the propagated and reflected pulses provides a direct measurement of said inclination angle.

2. The invention as defined in claim 1, wherein said reflecting plate is in the form of an involute curve.

3. The invention as defined in claim 1, wherein said electrical pulse equipment is located in a remote position from said meter.

4. Inclination metering apparatus as defined in claim 1, in addition comprising identical second pulse equipment and an identical second ultrasonic meter, wherein said second meter is mounted on, and at right angles to, said first meter.

References Cited by the Examiner

UNITED STATES PATENTS

| | | | |
|---|---|---|---|
| 2,019,497 | 11/1935 | Kuntze | 340—3 |
| 2,021,943 | 11/1935 | McCollum | 181—.5 |
| 2,520,297 | 8/1950 | Anderson | 340—6 |
| 2,629,082 | 2/1953 | Hare | 340—1 |
| 2,631,270 | 3/1953 | Goble | 181—.5 |
| 2,921,465 | 1/1960 | Cook | 181—.5 |

BENJAMIN A. BORCHELT, *Primary Examiner.*

R. M. SKOLNIK, *Assistant Examiner.*